US012388322B2

(12) United States Patent
Molnar, Jr. et al.

(10) Patent No.: US 12,388,322 B2
(45) Date of Patent: Aug. 12, 2025

(54) ELECTRIC GENERATOR BEHIND FAN IN TURBINE ENGINE

(71) Applicant: Rolls-Royce North American Technologies, Inc., Indianapolis, IN (US)

(72) Inventors: Daniel E. Molnar, Jr., Indianapolis, IN (US); Robert W. Heeter, Indianapolis, IN (US); Brian S. Maners, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 18/417,938

(22) Filed: Jan. 19, 2024

(65) Prior Publication Data

US 2024/0322646 A1    Sep. 26, 2024

Related U.S. Application Data

(60) Provisional application No. 63/492,040, filed on Mar. 24, 2023.

(51) Int. Cl.
*H02K 7/18* (2006.01)
*F02C 7/36* (2006.01)

(52) U.S. Cl.
CPC ............. *H02K 7/1823* (2013.01); *F02C 7/36* (2013.01); *F05D 2220/76* (2013.01)

(58) Field of Classification Search
None
See application file for complete search history.

(56) References Cited

U.S. PATENT DOCUMENTS

| | | | |
|---|---|---|---|
| 3,900,274 A * | 8/1975 | Johnston | F01D 7/00 416/157 R |
| 4,043,121 A | 8/1977 | Thomas et al. | |
| 5,595,474 A * | 1/1997 | Girard | B64C 11/44 416/162 |
| 5,867,980 A | 2/1999 | Bartos | |

(Continued)

FOREIGN PATENT DOCUMENTS

EP    1849987 A2    10/2007

OTHER PUBLICATIONS

U.S. Appl. No. 18/417,907, filed Jan. 19, 2024, naming inventors Molnar et al.

*Primary Examiner* — Jason H Duger
(74) *Attorney, Agent, or Firm* — Shumaker & Sieffert, P.A.

(57) ABSTRACT

A turbine engine includes a core section comprising at least one compressor and at least one turbine that both rotate about a longitudinal axis of the turbine engine; a core vane assembly coupled to the core section, wherein the core vane assembly comprises a plurality of core vanes configured to modify core fluid flow; a fan connected to the core section and configured to be rotated by the at least one turbine, rotation of the fan providing thrust to a vehicle that includes the turbine engine; and an electrical generator integrated into the core vane assembly and positioned in the core section aft of the fan and fore of the at least one compressor, wherein the electrical generator comprises: a rotor mechanically rotated via the fan or a shaft that is rotationally coupled to the fan, wherein the rotor rotates about the longitudinal axis; and a stator.

17 Claims, 5 Drawing Sheets

(56) References Cited

U.S. PATENT DOCUMENTS

| | | |
|---|---|---|
| 6,467,725 B1 | 10/2002 | Coles et al. |
| 7,140,174 B2 | 11/2006 | Johnson |
| 7,216,475 B2 | 5/2007 | Johnson |
| 7,246,484 B2 | 7/2007 | Giffin, III et al. |
| 7,395,657 B2 | 7/2008 | Johnson |
| 7,468,561 B2 | 12/2008 | Kern et al. |
| 7,475,545 B2 | 1/2009 | Johnson |
| 7,514,810 B2 * | 4/2009 | Kern .................... F02C 7/32 290/52 |
| 7,631,484 B2 | 12/2009 | Giffin et al. |
| 7,758,303 B1 | 7/2010 | Wadia et al. |
| 7,841,163 B2 | 11/2010 | Welch et al. |
| 7,926,290 B2 | 4/2011 | Johnson |
| 7,952,244 B2 | 5/2011 | Colin |
| 8,492,920 B2 | 7/2013 | Huang et al. |
| 8,522,522 B2 * | 9/2013 | Poisson .................... F02K 3/06 60/39.093 |
| 8,695,324 B2 | 4/2014 | Giffin et al. |
| 8,789,376 B2 | 7/2014 | Coffinberry |
| 9,016,041 B2 | 4/2015 | Baughman et al. |
| 11,131,208 B2 | 9/2021 | Auker et al. |
| 2004/0070211 A1 * | 4/2004 | Franchet .................... F02C 7/32 290/31 |
| 2006/0137355 A1 | 6/2006 | Welch et al. |
| 2007/0022735 A1 | 2/2007 | Henry et al. |
| 2011/0120083 A1 | 5/2011 | Giffin et al. |
| 2011/0167792 A1 | 7/2011 | Johnson et al. |
| 2011/0171007 A1 | 7/2011 | Johnson et al. |
| 2012/0189432 A1 | 7/2012 | Jordan et al. |
| 2018/0230805 A1 * | 8/2018 | Miller .................... F01D 5/03 |
| 2019/0002115 A1 * | 1/2019 | Miller .................... B64D 31/06 |
| 2019/0101057 A1 | 4/2019 | Stevenson et al. |
| 2019/0145322 A1 * | 5/2019 | Sellick .................... F02C 7/36 290/52 |
| 2021/0164392 A1 | 6/2021 | Harvey |
| 2022/0049648 A1 * | 2/2022 | Hughes .................... F01D 17/08 |
| 2022/0176900 A1 | 6/2022 | Klemen et al. |
| 2023/0399983 A1 * | 12/2023 | Ganiger .................... F01D 15/10 |
| 2024/0068377 A1 * | 2/2024 | Sibilli .................... F01D 15/10 |

* cited by examiner

ELECTRIC GENERATOR BEHIND FAN IN TURBINE ENGINE

This application claims the benefit of U.S. Patent Application No. 63/492,040, filed 24 Mar. 2023, the entire contents of which is incorporated herein by reference.

GOVERNMENT RIGHTS

This invention was made with Government support under Grant Contract Number FA8650-19-D2063 awarded by Air Force Research Laboratory (AFRL). The Government has certain rights in the invention.

TECHNICAL FIELD

This disclosure relates to electrical power generation in turbine engines.

BACKGROUND

A turbine engine is a type of internal combustion engine that may drive an electric generator for converting mechanical power produced by the turbine engine to electrical power used by other components of a system. Some applications (e.g., due to size and weight restrictions) may require the electric generator to be located within the housing of the turbine engine. During operation, some internally-located electric generators may produce excess heat that may interfere with operations being performed by the electric generator and/or other collocated components of the turbine engine. In addition, performing maintenance or inspections of some internally-located electric generators may be difficult as other collocated components of the turbine engine obstruct access to the electric generator.

SUMMARY

Recently, demand for electrical power on vehicles (e.g., aircraft and others) has increased. For example, larger electronics and/or hybrid consideration has encouraged incorporation of new or additional electrical generator capability on turbine engines, including turbofans. Electrical generators may be positioned at various locations on turbine engines. As one example, an electrical generator may be positioned inside a tail cone of the engine. However, the tail cone may be exposed to hotter turbine temperatures, which may degrade generator performance. As another example, an electrical generator may be positioned on an outside of the turbine engine and be driven by a drive shaft off a compressor. However, positioning the generator on the outside may be limiting due to size constraints (e.g., on generator physical size).

In accordance with one or more aspects of this disclosure, an electrical generator may be positioned in a cavity behind a fan rotor of a turbine engine. For instance, the electrical generator rotor and stator may be concentric with a drive shaft of the fan, and may be placed in a space between the fan rotor and the first compressor stage. Such a location may provide various advantages (e.g., over tail cone or external positions). For instance, temperatures in such a space may be relatively low, which may improve generator performance. Furthermore, there may be a relatively large volume available, which may enable use of a larger generator (e.g., for a wider range of power extraction options). As another example, positioning the electrical generator in said cavity may enable integration of the electrical generator with existing engine components, such as a core vane. In this way, this disclosure may enable turbine engine to include relatively larger and/or relatively more efficient electrical generators.

The details of one or more examples are set forth in the accompanying drawings and the description below. Other features, objects, and advantages will be apparent from the description and drawings, and from the claims.

DETAILED DESCRIPTION

Figure 1:
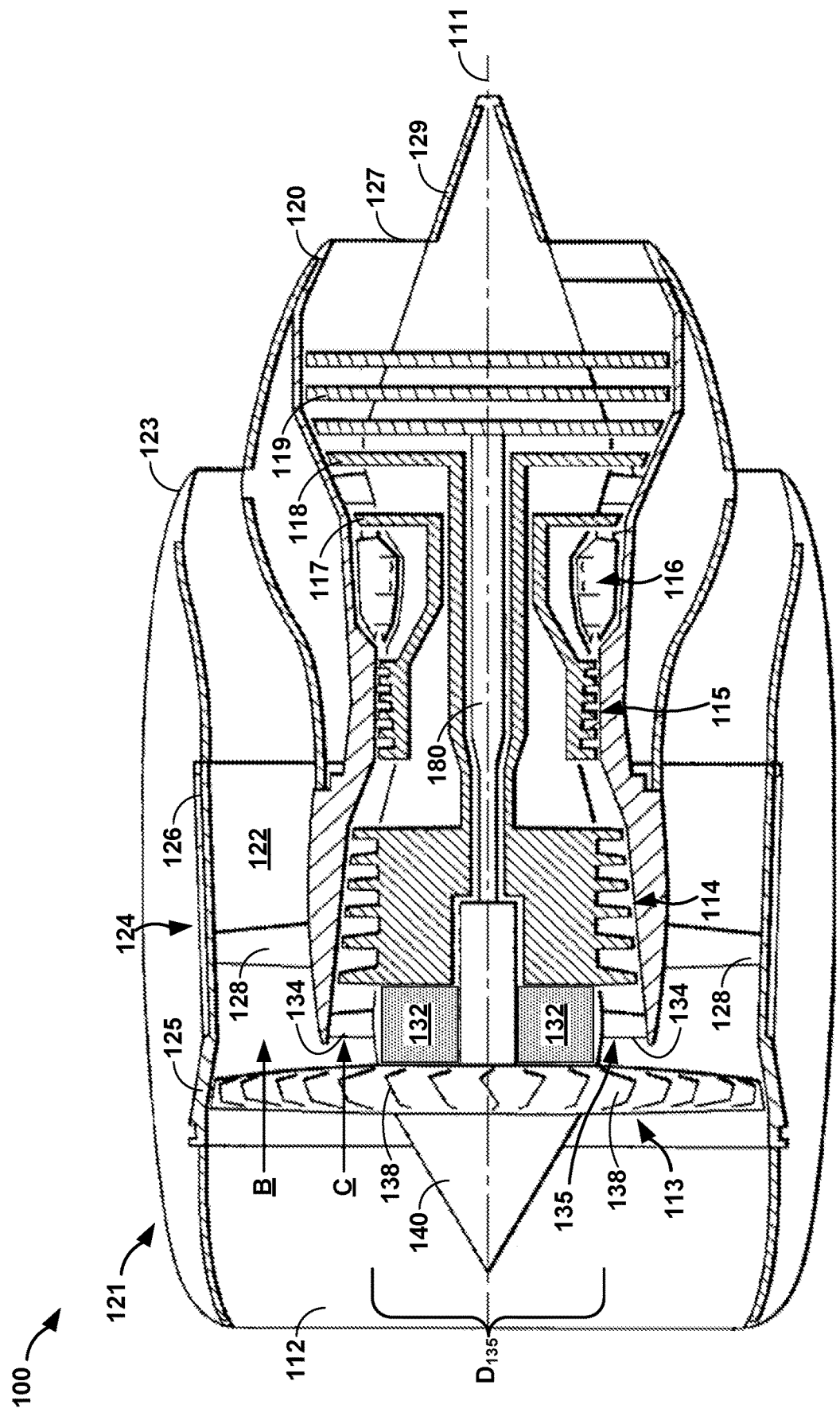
FIG. 1 is a conceptual diagram illustrating a cross-section of turbine engine 100 with an electric generator 132 for producing electrical power, in accordance with one or more techniques of this disclosure

FIG. 1 is a conceptual diagram illustrating a cross-section of turbine engine 100 with an electric generator 132 for producing electrical power, in accordance with one or more techniques of this disclosure. Turbine engine 100 may be configured to convert one form of power to mechanical energy in the form of a rotating turbine. The mechanical energy produced by turbine engine 100 may be used in a variety of ways or for a variety of systems and applications (e.g., aircraft, locomotives, watercraft, power plants, electric generators, and any or all other systems and applications that rely on mechanical energy from a turbine engine to perform work). As illustrated in FIG. 1, turbine engine 100 may be a ducted fan gas-turbine engine, which may be used to propel an aircraft.

As shown in FIG. 1, turbine engine 100 has a principal and rotational axis 111. Turbine engine 100 may include, in axial flow series, air intake 112, propulsive fan 113, intermediate pressure compressor 114, high-pressure compressor 115, combustion equipment 116, high-pressure turbine 117, intermediate pressure turbine 118, low-pressure turbine 119 and core exhaust nozzle 120. Turbine engine 100 may include nacelle 121, which may generally surround turbine engine 100 and defines intake 112, bypass duct 122 and an exhaust nozzle 123. Turbine engine 100 may include centerplug 129 is positioned within the core exhaust nozzle 120 to provide a form for the core gas flow C to expand against and to smooth its flow from the core engine. Centre-plug 129 may extend rearward of the core nozzle's exit plane 127.

Turbine engine 100 may operate such that air entering the intake 111 is accelerated by fan 113 to produce two air flows: a first airflow C (i.e., "core airflow") into intermediate pressure compressor 114 and a second airflow B (i.e., "bypass airflow") which passes through bypass duct 122 to provide propulsive thrust. Turbine engine 100 may be a high-bypass engine (e.g., a ratio of B to C is greater than a threshold ratio) or a low-bypass engine (e.g., a ratio of B to C is less than the threshold ratio). Intermediate pressure compressor 114 may compress the airflow C directed into it before delivering that air to the high-pressure compressor 115 where further compression may occur.

The compressed air exhausted from the high-pressure compressor 115 may be directed into combustion equipment 116 where it is mixed with fuel and the mixture combusted. The resultant hot combustion products may then expand through, and thereby drive the high, intermediate and low-pressure turbines 117, 118, 119 before being exhausted through nozzle 120 (and may thereby provide additional propulsive thrust). The high, intermediate and low-pressure turbines 117, 118, 119 may respectively drive the high and intermediate pressure compressors 115, 114 and the fan 113 by suitable interconnecting shafts. For instance, turbine engine 100 may include low-pressure shaft 180 that rotationally connects turbine 119 to fan 113.

While illustrated and described as a multi-shaft design, turbine engine 100 is no so limited. For instance, in some examples, turbine engine 100 may be a single shaft design (e.g., without separate HP/LP spools). Similarly, aspects of this disclosure are applicable to turbine engines of all ranges of thrust and sizes.

As noted above, fan 113 may be rotated using energy collected via turbine 119 (e.g., a power-turbine). As shown in FIG. 1, fan 113 may include a plurality of fan blades 138 connected to hub 140. Fan 113 may be circumferentially surrounded by a structural member in the form of a fan casing 124 (e.g., where turbine engine 100 is a ducted turbofan engine), which may be connected to an annular array of outlet guide vanes 128. Fan casing 124 may comprise a rigid containment casing 125 and attached rearwardly thereto is rear fan casing 126. As shown in FIG. 1, fan 113 (and/or other components of the engine core such as the high and intermediate pressure compressors 115, 114) may be connected to core vane assembly 135, including core vanes 134. Core vanes 134 may provide several functions. For instance, in addition to or in place of supporting fan 113, core vanes 134 may be shaped and arranged to straighten core airflow C before it reaches compressor 114. While illustrated in FIG. 1 as being a directly driven fan, in other examples fan 113 may be a geared turbofan. For instance, turbine engine 100 may include a gearbox mechanically between turbine 119 and fan 113. Core vane assembly 135 may have diameter $D_{135}$, which may approximately correspond to a diameter of at least a forward section of compressor 114.

One or more components of turbine engine 100 may be considered to form a core section. For instance, one or more of compressor 114, compressor 115, combustion equipment 116, and turbines 117, 118, 119 may form the core section of turbine engine 100. As noted above, core vanes 134 may be attached to the core section.

In accordance with one or more aspects of this disclosure, turbine engine 100 may include electrical generator 132, which may be positioned in a cavity behind fan 113 (e.g., aft of fan hub 140). Electrical generator 132 may be any type of electrical generator and may generally include a rotor and a stator that rotate relative to each other. The rotor and the stator of electrical generator 132 may be concentric with a drive shaft of fan 113 (e.g., shaft connecting turbine 119 to fan 113), and may be placed in a space between fan 113 and compressor 114. Such a location may provide various advantages (e.g., over tail cone or external positions). For instance, temperatures in such a space may be relatively low, which may improve performance of electrical generator 132 (e.g., as performance of electrical generators may degrade when heated). Furthermore, there may be a relatively large volume available, which may enable use of a larger generator (e.g., for a wider range of power extraction options). As another example, positioning electrical generator 132 in said cavity may enable integration of electrical generator 132 with existing engine components, such as a core vane (e.g., core vane 135 of FIG. 2). In this way, this disclosure may enable turbine engine 100 to include relatively larger and/or relatively more efficient electrical generators.

As noted above, positioning electrical generator 132 in the cavity behind fan 113 may provide several benefits. For instance, the large volume available may allow for larger sized components of electrical generator 132. As one example, an outer diameter of electrical generator 132 may be a large percentage of a diameter of core vane assembly 135 (e.g., 70%, 80%, 90%, 95%, etc.)

Electrical generator 132 may be any type of electrical generator. Examples of electrical generator 132 include, but are not limited to, alternators, dynamos, permanent magnet generators, field wound generators, synchronous, asynchronous, brushed, brushless, etc. In general, electrical generator 132 may include a stator and a rotor configured to rotate relative to the stator.

Figure 2:
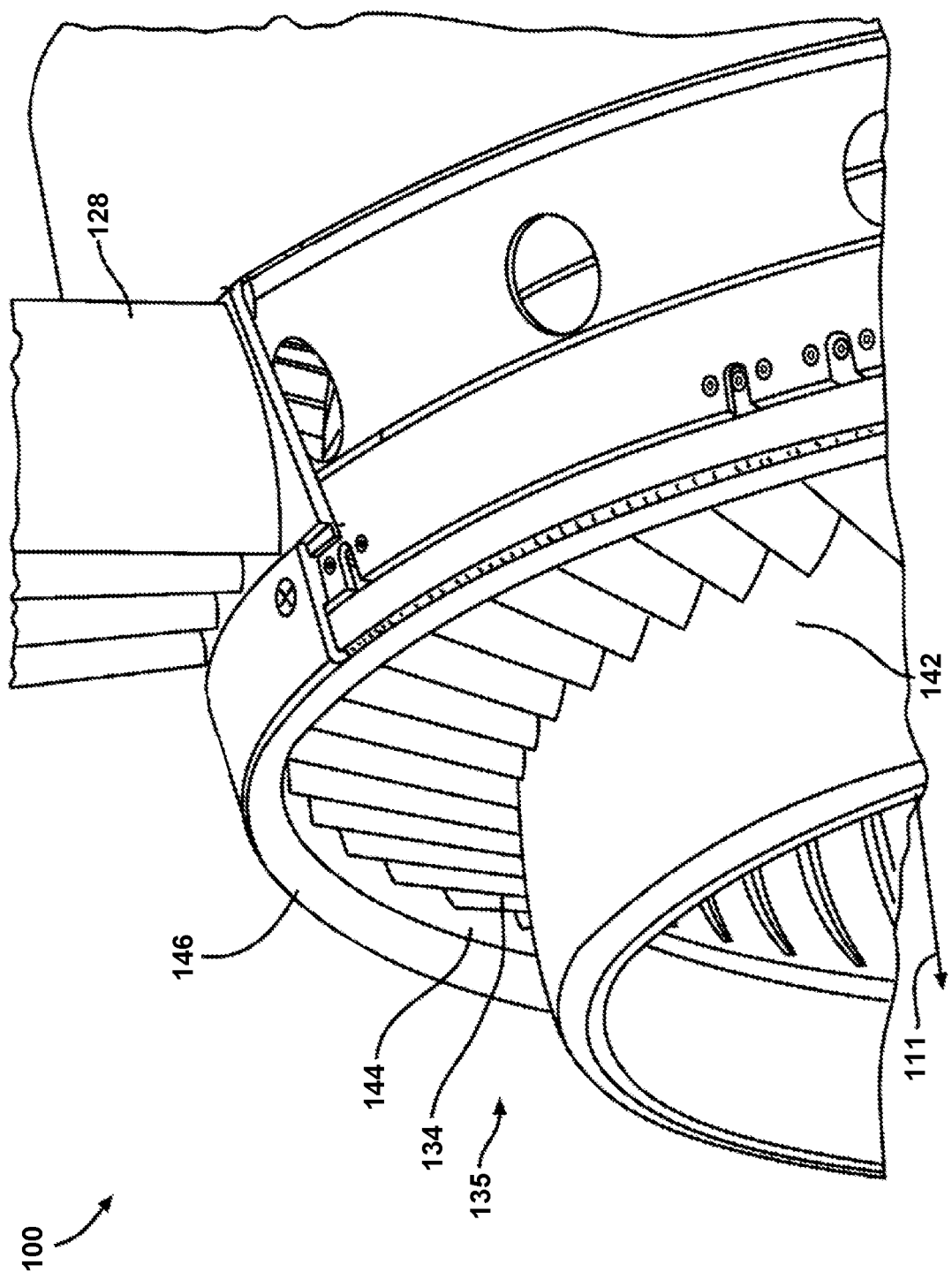
FIG. 2 is a conceptual diagram illustrating further details of the turbine engine 100 of FIG. 1.

FIG. 2 is a conceptual diagram illustrating further details of the turbine engine 100 of FIG. 1. As shown in FIG. 2, turbine engine 100 may include core vane assembly 135, which may encircle longitudinal axis 111. Core vane assembly 135 may include core vanes 132, each extending radially between inner hub 142 and outer band 144.

As discussed above, turbine engine 100 may include a core flow path and a bypass flow path. Core airflow C may flow through the core flow path and bypass airflow B may flow through the bypass flow path. As shown in FIG. 2, turbine engine 100 may include splitter ring 146, which may bifurcate the flow of fluid in the turbine engine 100. The core airflow C may pass inside the outer band 144 and the bypass airflow B may pass outside the outer band 144.

Components of core vane assembly 135 may be formed from any suitable substance. For instance, one or more of core vanes 132, inner hub 142, and outer band 144 may be formed from aluminum alloy, titanium, etc.

In accordance with one or more aspects of this disclosure, at least a portion of electrical generator 132 may be integrated into core vane assembly 135. As one example, a frame of electrical generator 132 may be integrated into inner hub 142 of core vane assembly 135. As discussed in further detail below, the frame may include a stator (e.g., which may include field windings/poles).

In some examples, a rotor of electrical generator 132 may be rotated by fan 113 or a shaft rotationally coupled to fan 113, such as shaft 180. For instance, turbine engine 100 may include a mechanical linkage connecting fan 113 to the rotor of electrical generator 132, such that fan 113 drives the rotor of electrical generator 132. In some examples, the mechanical linkage may be a direct linkage. For instance, the rotor of electrical generator 132 may be directly connected to fan 113 such that the rotation speeds of fan 113 and the rotor of electrical generator 132 are the same. In some examples, the mechanical linkage may include a gearbox connected between the rotor of electrical generator 132 and fan 113 such that the rotation speeds of fan 113 and the rotor of electrical generator 132 are different (e.g., such that the rotor of electrical generator 132 either spins faster or slower than fan 113).

In some examples, core vane assembly 135 may be structural. For instance, core vane assembly 135 may be considered structural where core vane assembly 135 is used to transfer mechanical loads to the core section of turbine engine 100 (e.g., transfer thrust produced by turbine engine 100 to a forward engine mount structure, which may then transfer said thrust to a vehicle that carries turbine engine 100). In some examples, core vane assembly 135 may be non-structural. For instance, core vane assembly 135 may be considered non-structural where core vane assembly 135 is not used to transfer substantial mechanical loads to the core section of turbine engine 100 and/or is not used to support fan 113.

Figure 3:
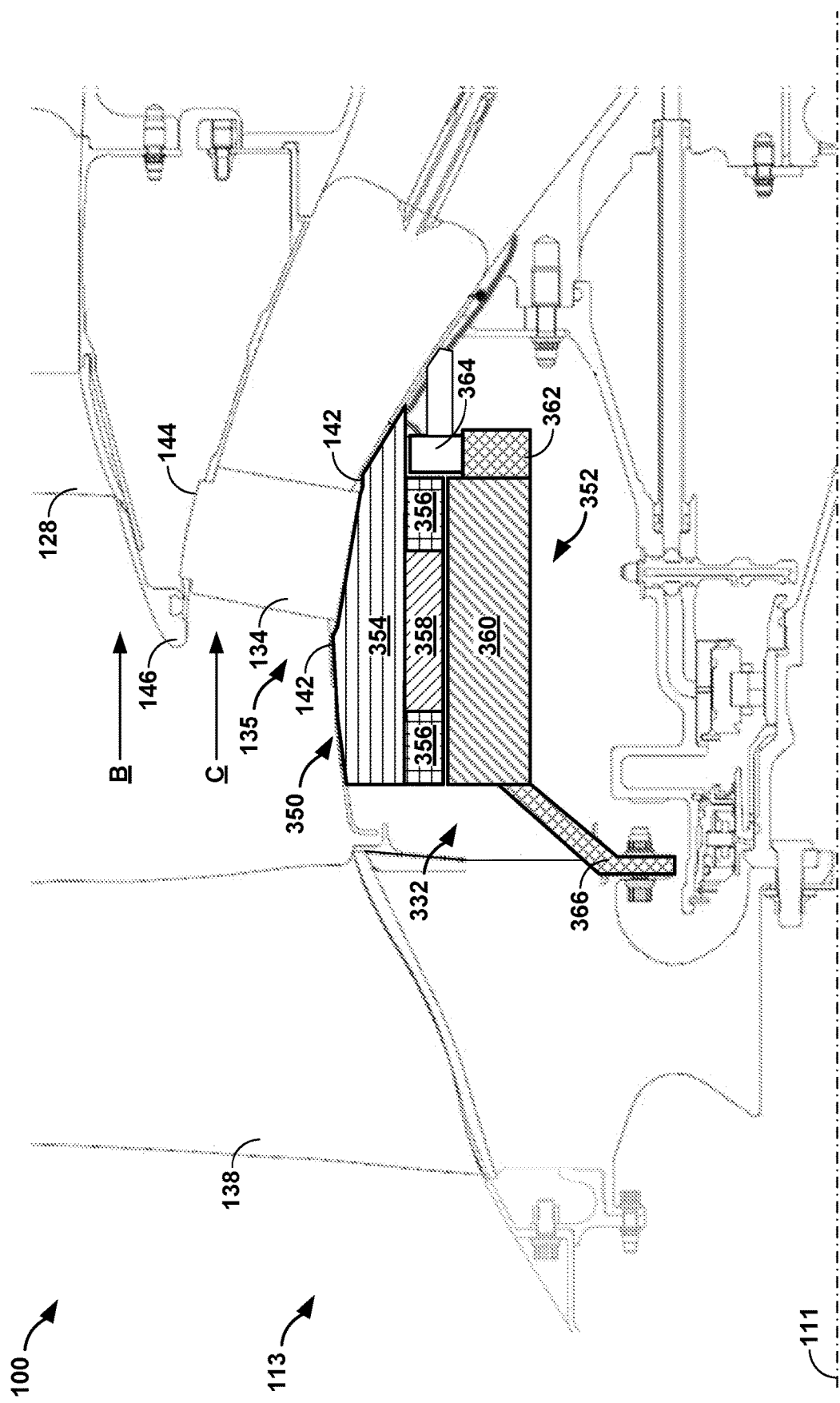
FIG. 3 is a conceptual diagram illustrating further details of one example of turbine engine 100 of FIG. 1 with an electrical generator having a fan-driven rotor, in accordance with one or more aspects of this disclosure.

FIG. 3 is a conceptual diagram illustrating further details of one example of turbine engine 100 of FIG. 1 with a fan-driven rotor, in accordance with one or more aspects of this disclosure. As noted above, turbine engine 100 may include electrical generator 132 positioned behind fan 113. Electrical generator 332 may be an example of electrical generator 132. As shown in FIG. 3, electrical generator 332 may include stator 350 and rotor 352. Stator 350 may include frame 354, windings 356, and pole 358. Rotor 352 may include armature 360 and commutator 362. In general, rotor 352 may rotate about longitudinal axis 111 relative to stator 350. The relative rotation of rotor 352 and stator 350 may generate electrical power. In general, frame 354 may mechanically support one or more other components of electrical generator 332, such as windings 356, and pole 358. Electrical generator 332 may also include brush 364.

Rotor 352 may be mechanically rotated by fan 113 or a drive shaft connected to fan 113 (e.g., low pressure shaft 180). For instance, turbine engine 300 may include mechanical linkage 366 which may rotationally couple rotor 352 to fan 313. In some examples, mechanical linkage 366 may be a direct linkage. For instance, mechanical linkage 366 may directly link rotor 352 to fan 113 (e.g., such that rotor 352 rotates at a same rate as fan 113). In some examples, mechanical linkage 366 may be an indirect linkage. For instance, mechanical linkage 366 may include a gearbox mechanically connected between rotor 352 and fan 113 (e.g., such that rotor 352 can rotate at a different rate from fan 113, such as 0.5× the rate, 2× the rate, etc.). In some examples, mechanical linkage 366 may include a clutch such that rotor 352 may be selectively rotationally coupled to fan 113. While illustrated as being connected to fan 113, in some examples mechanical linkage 366 may be connected to a shaft that drives fan 113, such as low pressure shaft 180.

One or more components of electrical generator 332, such as at least a portion of stator 150, may be at least partially integrated into core vane assembly 335. As one example, stator 350 may be integral to inner hub 142 of core vane assembly 335. For instance, frame 354 of stator 350 may be integrated into inner hub 142. In some examples, frame 154 may be considered as being integrated into inner hub 142 where inner hub 142 is profiled to form frame 354. In other examples, frame 354 may be considered as being integrated into inner hub 142 where frame 354 is a discrete component that is directly attached to inner hub 142.

Components of electrical generator 332 may generate heat during operation. As electrical generator 332 may operate more efficiently at lower temperatures, it may be desirable to remove heat (i.e., cool) electrical generator 332. Aspects of this disclosure may enable beneficial cooling of electrical generator 332. For instance, core vane assembly 135 may cool electrical generator 332. As one example, such as where components of electrical generator 332 are integrated into core vane assembly 135, core vane assembly 135 may conduct heat from electrical generator 332 into the core fluid flow C (i.e., radiate heat into the core fluid flow). With the cooling provided by core vane assembly 135, aspects of this disclosure may allow for higher power extraction by electrical generator 332 (e.g., through thermal management). Another benefit that the arrangements of this disclosure may provide is a simpler system without separate or active thermal management (such as oil cooling or refrigerant, etc.). For instance, this disclosure enables cooling without using pumps or moving parts (e.g., cooling via core fluid flow C), which may be attractive in certain applications.

Power generated by electrical generator 332 may be carried through conductors routed through any suitable pathway. As one example, core vane assembly 135 may include conductors configured to carry electrical power generated by electrical generator 132. For instance, the conductors may pass through core vanes 134 (e.g., in order to transport the power out of the core section).

Figure 4:
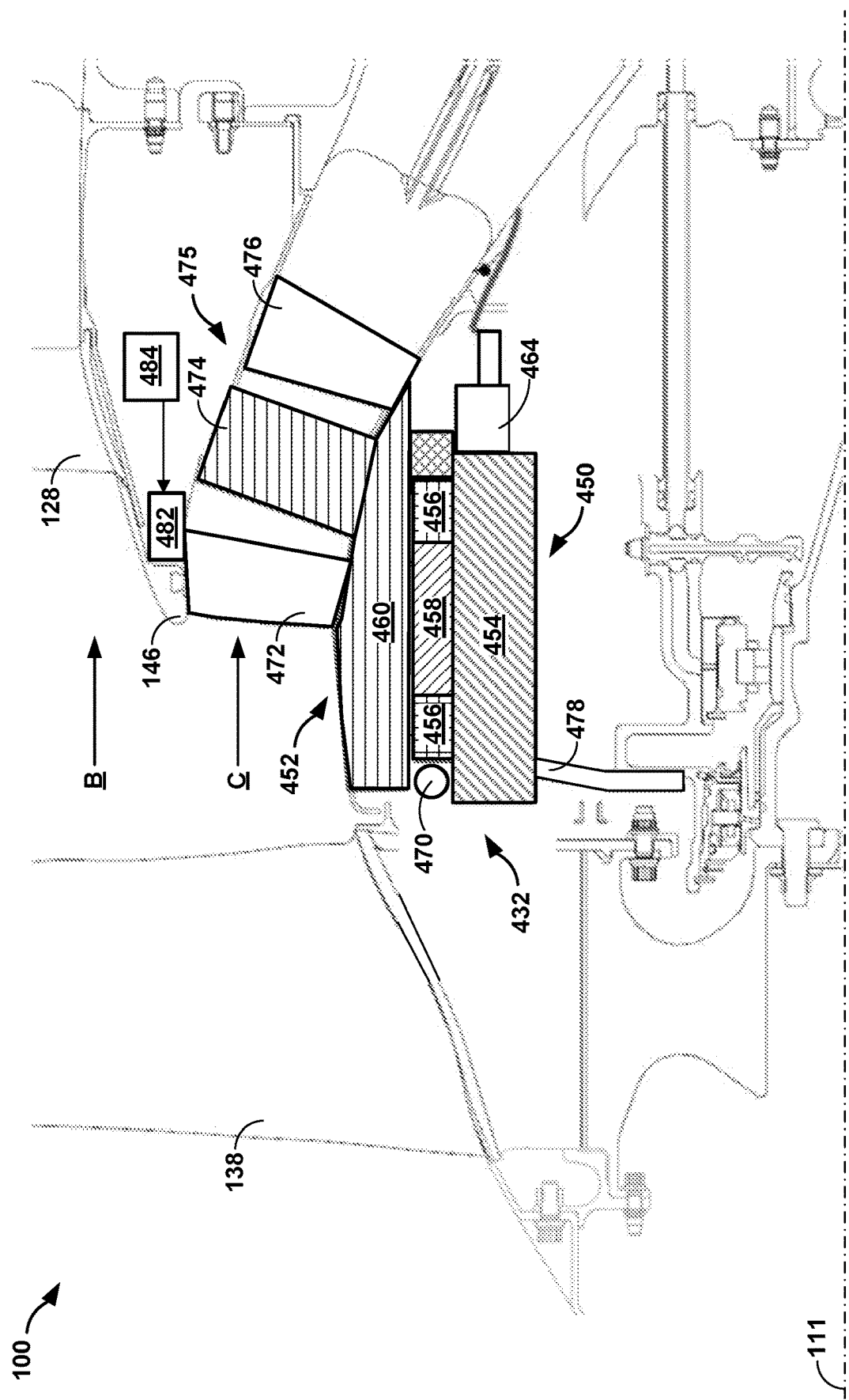
FIG. 4 is a conceptual diagram illustrating further details of one example of turbine engine 100 of FIG. 1 with an electrical generator having a rotor driven by an independent turbine, in accordance with one or more aspects of this disclosure.

FIG. 4 is a conceptual diagram illustrating further details of one example of turbine engine 100 of FIG. 1 with an independent turbine driven rotor, in accordance with one or more aspects of this disclosure. As noted above, turbine engine 100 may include electrical generator 132 positioned behind fan 113. Electrical generator 432 may be an example of electrical generator 132. As shown in FIG. 4, electrical generator 432 may include stator 450 and rotor 452. Stator 450 may include frame 454, windings 456, pole 458. Rotor 452 may include armature 460. In general, rotor 452 may rotate about longitudinal axis 111 relative to stator 450. In contrast to the example of FIG. 3 where rotor 352 rotates within stator 350, rotor 452 may rotate around stator 450 in FIG. 4. The relative rotation of rotor 452 and stator 450 may generate electrical power.

When turbine engine 100 is operating, fan 113 generates a pressure ratio from which work can be extracted. In accordance with one or more aspects of this disclosure, electrical generator 432 may include a turbine configured to extract work from the core fluid flow. For instance, rotor 452 of electrical generator 432 may include turbine 475 that includes a plurality of turbine blades 474 radially distributed on an outer surface of rotor 452. Turbine blades 474 may be rotated by the core fluid flow C, and may in turn rotate rotor 452 thereby causing electrical generator 432 to generate electrical power.

In some of such examples, core vane assembly 135 may include (in addition to or in place of core vanes 134) inlet guide vanes 472 and outlet guide vanes 476. Inlet guide vanes 472 may be angled to direct flow at a desired incidence to turbine blades 474. Outlet guide vanes 476 may re-straighten core fluid flow C as needed (e.g., to control flow into compressor stages).

As noted above, turbine 475 may include turbine blades 474. In some examples, turbine 475 may be a single stage turbine. For instance, turbine blades 474 may be arranged in a single row. In some examples, turbine 475 may be a multi-stage turbine. For instance, turbine blades 474 may be arranged in multiple rows (e.g., displaced along longitudinal axis 111).

In some examples, turbine 475 may be directly attached to rotor 452. For instance, turbine blades 474 may be directly mounted to rotor 452.

Utilizing core fluid flow C to drive electrical generator 432 may provide various advantages. As one example, driving electrical generator 432 directly by extracting energy from the fan discharge flows may allow electrical generator 432 to be packaged independently from other shafting. In such examples, electrical generator 432 may become a standalone component that may only share a centerline with turbine engine 100 (i.e., longitudinal axis 111) but not other engine shafting. For instance, electrical generator 432 may not be rotationally coupled to low pressure shaft 180. Similar to electrical generator 332 of FIG. 3, electrical generator 432 may also be cooled by flow straightening vanes that are part of a single or multi-stage turbine on the outer diameter of electrical generator 432.

In some examples, electrical generator 432 may include various components that may assist in the rotation of rotor 452. For instance, electrical generator 432 may include bearings 470. In some examples, electrical generator 432 may include one or more structural elements configured to physically support electrical generator 432. For instance, electrical generator 432 may include support element 478, which may support at least frame 454 of electrical generator 432.

As discussed above, electrical generator 432 may include inlet guide vanes 472 and outlet guide vanes 476. In some examples, one or both of inlet guide vanes 472 and outlet guide vanes 476 may be fixed pitch vanes. For instance, where inlet guide vanes 472 are fixed pitch, inlet guide vanes 472 may not have adjustable pitch. In some examples, one or both of inlet guide vanes 472 and outlet guide vanes 476 may be variable pitch vanes. For instance, where inlet guide vanes 472 are variable pitch, electrical generator 432 may include actuators that adjust the pitch of inlet guide vanes 472. In some examples, electrical generator 432 may include a controller, such as controller 484 which may control actuator 482 to change the pitch of inlet guide vanes 472. In operation, controller 484 may change the pitch of inlet guide vanes 472 in order to adjust an amount of power generated by electrical generator 432.

Controller 484 may adjust the pitch of inlet guide vanes 472 with some independence from the rest of the system especially with turbine engine 100 operating at higher power. Controller 484 may adjust the pitch of inlet guide vanes 472 to control generator speed (e.g., a rotational speed of electrical generator 432) to the desired power level or charge a battery. This may be especially valuable at cruise where electrical power demands may be less compared to situations where electrical power is needed for other reasons like managing distributed fans for flow or distortion management, deicing power, auxiliary systems, etc. that may be less in demand at cruise. In some examples, the battery may discharge electrical power to supplement electrical generator 432 at these conditions after being charged.

Being decoupled from low-pressure shaft 180, turbine engine 100 can also mitigate electrical overload/faults that may result from electrical generator 432 being at high speed (higher electrical load). Indication of fault could be managed by unloading the generator turbine with the variable vane to reduce generator speed (e.g., by controller 484).

Turbine engine 100 may include one or more safety features for electrical generator 132. As one example, turbine engine 100 may include a clutch, such as dog clutch, which may be engaged to stop rotation of electrical generator 132 (e.g., in the event of a fault). In examples where electrical generator 132 is mechanically rotated by fan 113 (e.g., the example of FIG. 3), the connecting components may be configured to shear (e.g., such that fan 113 may still freely rotate).

Figure 5:
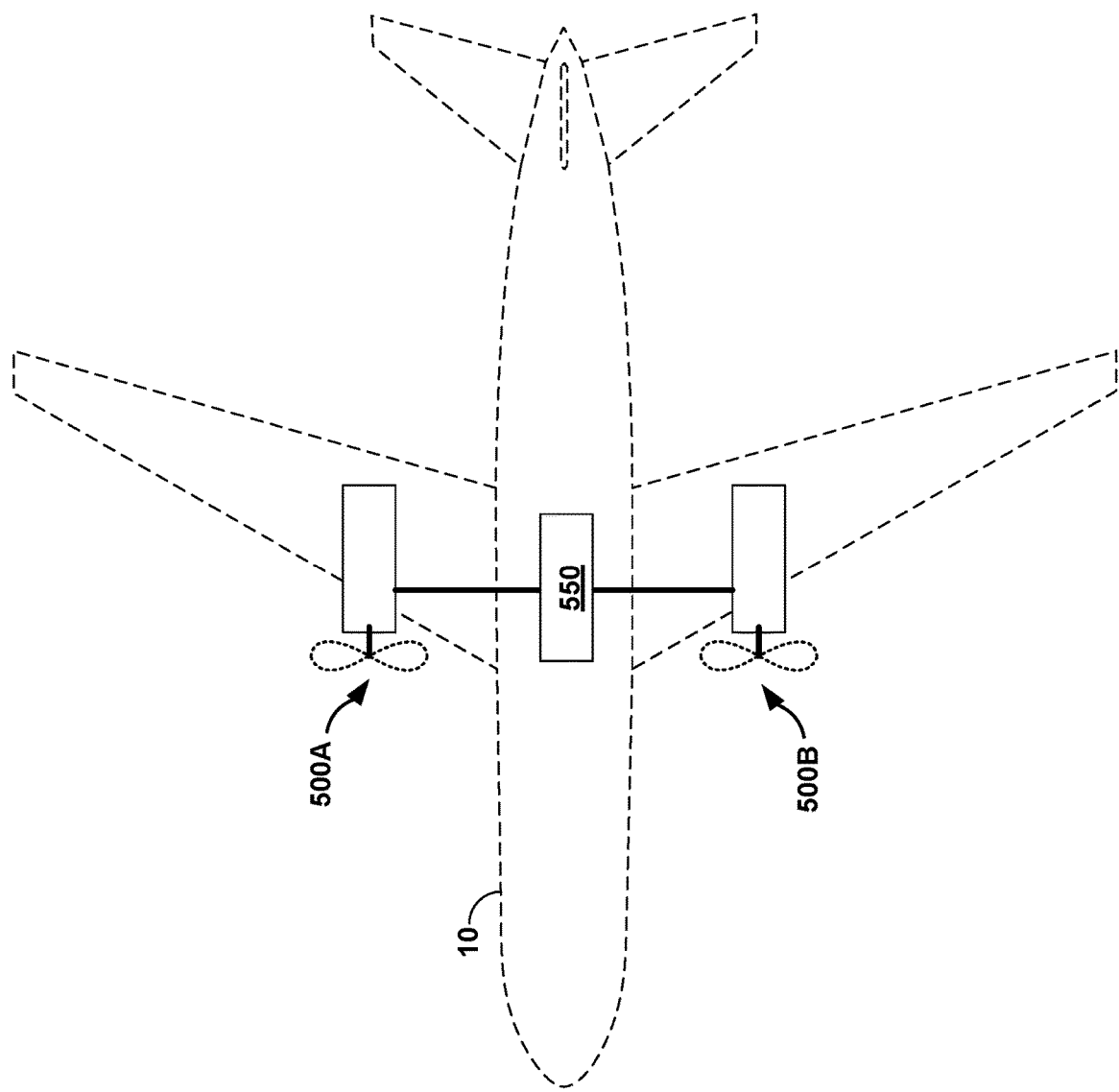
FIG. 5 is a conceptual diagram illustrating an example aircraft, in accordance with one or more aspects of the disclosure.

FIG. 5 is a conceptual diagram illustrating an example aircraft, in accordance with one or more aspects of the disclosure. Aircraft 10 of FIG. 5 may be aircraft that includes one or more turbine engines 500A and 500B (collectively, "turbine engines 500"), which may provide thrust and/or electrical power to aircraft 10. Examples of aircraft 10 include, but are not limited to fixed wing, rotorcraft, vertical takeoff (e.g., VTOL), short takeoff (e.g., STOL), and the like.

Each of turbine engines 500 may be an example of turbine engine 100 of FIG. 1. As one example, turbine engine 500A may include an electrical generator having a fan-driven rotor (e.g., similar to the example of FIG. 3). As another example, turbine engine 500A may include an electrical generator having a rotor driven by an independent turbine (e.g., similar to the example of FIG. 4).

One or more of turbine engines 500 may output electrical power to a load of aircraft 10, such as load 550. In some examples, load 550 may be a relatively high power consumption load. As such, it may be desirable to include higher power generation capacity electric machines, such as those described in this disclosure.

The following numbered examples demonstrate one or more aspects of the disclosure.

Example 1A

A turbine engine comprising: a core section comprising at least one compressor and at least one turbine that both rotate about a longitudinal axis of the turbine engine; a core vane assembly coupled to the core section, wherein the core vane assembly comprises a plurality of core vanes configured to modify core fluid flow; a fan connected to the core section and configured to be rotated by the at least one turbine, rotation of the fan providing thrust to a vehicle that includes the turbine engine; and an electrical generator integrated into the core vane assembly and positioned in the core section aft of the fan and fore of the at least one compressor, wherein the electrical generator comprises: a rotor mechanically rotated via the fan or a shaft that is rotationally coupled to the fan, wherein the rotor rotates about the longitudinal axis; and a stator.

Example 2A

The turbine engine of example 1A, wherein the rotor of the electrical generator is directly mechanically linked to the fan or a shaft that is directly mechanically linked to the fan.

Example 3A

The turbine engine of example 2A, wherein the rotor is configured to rotate at a same rate as the fan.

Example 4A

The turbine engine of example 1A, further comprising a gearbox mechanically connected between the rotor of the electrical generator and the fan such that the rotor of the electrical generator rotates at a different rate from the fan.

Example 5A

The turbine engine of any of examples 1A-4A, wherein the stator of the electrical generator is integral to an inner hub of the core vane assembly.

Example 6A

The turbine engine of example 5A, wherein the core vane assembly radiates heat emitted by the electrical generator into the core fluid flow.

Example 7A

The turbine engine of any of examples 1A-6A, wherein the stator of the electrical generator comprises one or more windings that are mechanically supported by a frame, and wherein the frame is integrated into an inner hub of the core vane assembly.

Example 8A

The turbine engine of example 7A, wherein the inner hub of the core vane assembly is profiled to form the frame.

Example 9A

The turbine engine of example 8A, wherein the frame is a discrete component that is directly attached to the inner hub.

Example 10A

The turbine engine of any of examples 1A-9A, wherein the core vane assembly is non-structural.

Example 11A

The turbine engine of any of examples 1A-9A, wherein the core vane assembly is structural.

Example 12A

The turbine engine of any of examples 1A-11A, wherein the core vane assembly includes conductors configured to carry electrical power generated by the electrical generator.

Example 1B

A turbine engine comprising: a core section comprising at least one compressor and at least one turbine that both rotate about a longitudinal axis of the turbine engine; a fan connected to the core section and configured to be rotated by the at least one turbine, rotation of the fan providing thrust to a vehicle that includes the turbine engine; and an electrical generator integrated into the core vane assembly and positioned in the core section aft of the fan and fore of the at least one compressor, wherein the electrical generator comprises: a turbine configured to extract work from a core fluid flow, the turbine configured to rotate about the longitudinal axis; a rotor mechanically rotated by the turbine of the electrical generator, the rotor configured to rotate about the longitudinal axis; and a stator.

Example 2B

The turbine engine of example 1B, further comprising: a core vane assembly coupled to the core section, wherein the core vane assembly comprises: a plurality of inlet guide vanes upstream from the turbine of the electrical generator; and a plurality of outlet guide vanes upstream from the turbine of the electrical generator.

Example 3B

The turbine engine of example 2B, wherein at least some of the plurality of inlet guide vanes are fixed pitch vanes.

Example 4B

The turbine engine of example 2B, wherein at least some of the plurality of inlet guide vanes are variable pitch vanes.

Example 5B

The turbine engine of example 4B, further comprising: a controller configured to adjust the variable pitch vanes to adjust an amount of power generated by the electrical generator.

Example 6B

The turbine engine of any of examples 1B-5B, wherein the core vane assembly radiates heat emitted by the electrical generator into the core fluid flow.

Example 7B

The turbine engine of any of examples 1B-6B, further comprising a low pressure shaft connecting the at least one turbine to the fan, wherein the rotor of the electrical generator is not rotationally coupled to the low pressure shaft.

Example 8B

The turbine engine of any of examples 1B-7B, further comprising: a clutch configured to selectively inhibit rotation of the rotor.

Example 9B

The turbine engine of any of examples 1B-8B, wherein the turbine of the electrical generator is a single stage turbine.

Example 10B

The turbine engine of any of examples 1B-8B, wherein the turbine of the electrical generator is a multi-stage turbine.

Example 11B

The turbine engine of any of examples 1B-10B, wherein the turbine of the electrical generator is attached directly to the rotor of the electrical generator.

Example 1C

Any combination of examples 1A-11B.

Various examples have been described. These and other examples are within the scope of the following claims.

What is claimed is:

1. A turbine engine comprising:
   a core section receiving a core fluid flow, the core section comprising one or more compressors and at least one turbine that both rotate about a longitudinal axis of the turbine engine;
   a core vane assembly coupled to the core section, wherein the core vane assembly comprises a plurality of core vanes configured to modify the core fluid flow;
   a fan connected to the core section and configured to be rotated by the at least one turbine, rotation of the fan providing thrust to a vehicle that includes the turbine engine;

a splitter ring that bifurcates a flow from the fan into the core fluid flow and a bypass airflow that passes into a bypass duct; and an electrical generator integrated into the core vane assembly and positioned in the core section aft of the fan and fore of a most upstream stage of all the one or more compressors, the electrical generator having an upstream end fore of the splitter ring and a downstream end aft of the plurality of core vanes, wherein the electrical generator comprises:

a rotor including an armature mechanically rotated via the fan by a linkage, the linkage having a first end fixed to the armature at the upstream end of the electrical generator and a second end fixed to the fan, wherein the rotor rotates about the longitudinal axis at a same rate as the fan; and a stator including a frame extending to the upstream end of the electrical generator and formed by an inner hub of the core vane assembly, the plurality of core vanes extending from the frame.

2. The turbine engine of claim 1, wherein the stator of the electrical generator is integral to the inner hub of the core vane assembly.

3. The turbine engine of claim 2, wherein the core vane assembly radiates heat emitted by the electrical generator into the core fluid flow.

4. The turbine engine of claim 1, wherein the stator of the electrical generator comprises one or more windings that are mechanically supported by the frame.

5. The turbine engine of claim 4, wherein the frame mechanically supports a pole of the stator.

6. The turbine engine of claim 1, wherein the core vane assembly is non-structural.

7. The turbine engine of claim 1, wherein the core vane assembly is structural.

8. The turbine engine of claim 1, wherein the core vane assembly includes conductors configured to carry electrical power generated by the electrical generator.

9. The turbine engine of claim 1, wherein the electrical generator is concentrically located with the plurality of core vanes.

10. The turbine engine of claim 9, wherein the electrical generator is not axially overlapping with any of the one or more compressors.

11. The turbine engine of claim 1, wherein the one or more compressors comprise intermediate pressure and high pressure compressors.

12. An airframe comprising:
a first turbine engine of one or more turbine engines, the first turbine engine comprising:
a core section receiving a core fluid flow, the core section comprising one or more compressors and at least one turbine that both rotate about a longitudinal axis of the turbine engine;
a core vane assembly coupled to the core section, wherein the core vane assembly comprises a plurality of core vanes configured to modify the core fluid flow;
a fan connected to the core section and configured to be rotated by the at least one turbine, rotation of the fan providing thrust to the airframe;
a splitter ring that bifurcates a flow from the fan into the core fluid flow and a bypass airflow that passes into a bypass duct; and
an electrical generator integrated into the core vane assembly and positioned in the core section aft of the fan and fore of a most upstream stage of all the one or more compressors, the electrical generator having an upstream end fore of the splitter ring and a downstream end aft of the plurality of core vanes, wherein the electrical generator comprises:
a rotor including an armature mechanically rotated via the fan by a linkage, the linkage having a first end fixed to the armature at the upstream end of the electrical generator and a second end fixed to the fan, wherein the rotor rotates about the longitudinal axis; and
a stator including a frame extending to the upstream end of the electrical generator and formed by an inner hub of the core vane assembly, the plurality of core vanes extending from the frame.

13. The airframe of claim 12, wherein the stator of the electrical generator is integral to the inner hub of the core vane assembly.

14. The airframe of claim 13, wherein the core vane assembly radiates heat emitted by the electrical generator into the core fluid flow.

15. The airframe of claim 12, wherein the stator of the electrical generator comprises one or more windings that are mechanically supported by the frame.

16. The airframe of claim 12, further comprising:
a second turbine engine of the one or more turbine engines; and
a load that receives electrical energy produced by electrical generators of the one or more turbine engines, the electrical generators of the one or more turbine engines including the electrical generator of the first turbine engine.

17. A turbine engine comprising:
a core section receiving a core fluid flow, the core section comprising one or more compressors and at least one turbine that both rotate about a longitudinal axis of the turbine engine;
a core vane assembly coupled to the core section, wherein the core vane assembly comprises a plurality of core vanes configured to modify the core fluid flow;
a fan connected to the core section and configured to be rotated by the at least one turbine, rotation of the fan providing thrust to a vehicle that includes the turbine engine;
a splitter ring that bifurcates a flow from the fan into the core fluid flow and a bypass airflow that passes into a bypass duct; and
an electrical generator integrated into the core vane assembly and positioned in the core section aft of the fan and fore of a most upstream stage of all the one or more compressors, the electrical generator having an upstream end fore of the splitter ring and a downstream end aft of the plurality of core vanes, wherein the electrical generator is not axially overlapping with any of the one or more compressors, and wherein the electrical generator comprises:
a rotor including an armature mechanically rotated via the fan by a linkage, the linkage having a first end fixed to the armature at the upstream end of the electrical generator and a second end fixed to the fan, wherein the rotor rotates about the longitudinal axis at a same rate as the fan; and
a stator including a frame extending to the upstream end of the electrical generator and formed by an inner hub of the core vane assembly, the plurality of core vanes extending from the frame.

* * * * *